(12) United States Patent
Etchells, III et al.

(10) Patent No.: US 7,009,028 B2
(45) Date of Patent: Mar. 7, 2006

(54) CONTINUOUS PROCESS FOR THE PRODUCTION OF POLYAMIDES

(75) Inventors: Arthur William Etchells, III, Philadelphia, PA (US); Frederick K. Mallon, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 194 days.

(21) Appl. No.: 10/439,463

(22) Filed: May 16, 2003

(65) Prior Publication Data

US 2004/0230027 A1 Nov. 18, 2004

(51) Int. Cl.
*C08G 69/26* (2006.01)
*C08G 69/08* (2006.01)
*C08G 73/10* (2006.01)

(52) U.S. Cl. .................. 528/310; 528/335; 528/332; 528/340; 528/348; 528/349

(58) Field of Classification Search ................ 528/340, 528/310, 335
See application file for complete search history.

(56) References Cited

U.S. PATENT DOCUMENTS

| | | | |
|---|---|---|---|
| 3,006,899 A | 10/1961 | Hill, Jr. et al. | |
| 3,063,966 A | 11/1962 | Kwolek et al. | |
| 3,094,511 A | 6/1963 | Hill, Jr. et al. | |
| 3,640,970 A | 2/1972 | Ozawa et al. | |
| 4,009,154 A | 2/1977 | Noma et al. | |
| 4,885,356 A | 12/1989 | Milligan et al. | |
| 5,432,255 A | 7/1995 | Jung et al. | |
| 6,169,162 B1 * | 1/2001 | Bush et al. | 528/310 |

FOREIGN PATENT DOCUMENTS

| | | |
|---|---|---|
| DD | 117 967 A | 2/1976 |
| DE | 26 06 878 | 9/1977 |

* cited by examiner

*Primary Examiner*—P. Hampton Hightower (57) ABSTRACT

In a two-step precondensate process for preparing polyamides diamines are reacted with dicarboxylic acid dihalides in a polar, non-basic, inert organic liquid medium under conditions such that a condensation product having a low degree of polymerization is formed. The resulting condensation then is contacted with an aqueous solution of a water-soluble acid acceptor by continuously feeding the components into a reactor system having a total residence time from about 2 seconds to about 2 minutes, and having a Peclet number greater than about 3.5 to form a polyamide product having a high degree of polymerization.

29 Claims, 1 Drawing Sheet

CONTINUOUS PROCESS FOR THE PRODUCTION OF POLYAMIDES

BACKGROUND OF THE INVENTION (1) Field of the Invention

This invention relates to a process for preparing polyamides having a high degree of polymerization from diamines and dicarboxylic acids, and particularly to a novel continuous polymerization process for preparing wholly or even partially aromatic polyamides from aromatic diamines and aromatic dicarboxylic acid dihalides. Linear polyamides having a high degree of polymerization made from diamines and dicarboxylic acid dihalides, particularly aromatic diamines and aromatic dicarboxylic acid dihalides can be processed into fibers, films, coatings and other shaped articles.

(2) Description of Related Art

Heretofore, (a) an interfacial polycondensation method, (e.g. U.S. Pat. No. 3,006,899), and (b) a low temperature solution polycondensation method, (e.g. U.S. Pat. No. 3,063,966), have been known as methods of preparing aromatic polyamides from aromatic diamines and aromatic dicarboxylic acid halides. These methods are regarded as being superior to other methods of obtaining aromatic polyamides, such as (i) dehydration condensation by heat between aromatic diamines and aromatic dicarboxylic acids, or (ii) condensation by heat with removal of phenols between aromatic diamines and diphenyl esters of aromatic dicarboxylic acids. In the dehydration-condensation method, the condensation does not proceed smoothly even at temperatures above 200° C., and in most cases, heat decomposition occurs to form a colored product containing insoluble gel. In the condensation with phenyl esters method, the phenyl esters must be derived from the corresponding acid chloride, which is a better reactant to give polyamides, but makes the method less efficient. These condensation methods must also be carried out at high temperatures for long periods of time, whereas the first-mentioned two methods (a) and (b) may be carried out at room temperature or below and require only a few minutes for the reaction to complete.

However, the first-mentioned two methods, (a) interfacial polycondensation and (b) the low temperature solution polycondensation method have various disadvantages. It is known that in the interfacial polycondensation method (a), controlling the molecular weight of the product is very difficult. The degree of polymerization of the resulting polymer depends upon and is very susceptible to slight changes in non-stoichiometric conditions, such as the concentrations of reactants, rates of addition thereof, size of the reactor vessel, the speed of stirring, and the type of solvents to be used. Once reactants have been charged, it is impossible to adjust the degree of polymerization of the final polymer by an additional feed because the degree of polymerization is predetermined by a delicate combination of the reaction conditions such as mentioned above. Moreover, when a copolymer is to be prepared according to the method, the main chain structure of the copolymer cannot be controlled. It has also been found that if a large-sized reaction vessel is used in practice, a polymer having a high degree of polymerization is not obtainable by this method.

On the other hand, in the low temperature solution polycondensation method (b), the molecular weight control of the final polymer is rather easy. However, when high molecular weight products are sought the selection of solvents to be used is limited, and various difficulties are encountered, for instance, in the separation of the product from the solution and from the occurrence of side-reactions. In addition, the product is always present together with hydrohalic salts as the reaction by-product. The removal of the by-product requires a long and tedious process, such as precipitation-and-rinse, or a complicated treatment after shaping the product into an article. It is therefore difficult to obtain a product free from those salts and having sufficient heat stability.

Two patents, U.S. Pat. Nos. 3,640,970 and 4,009,154, disclose a two-step process for preparing aromatic polyamides by (1) reacting substantially equal molar amounts of diamine with a dicarboxylic acid dihalide in a polar, non-basic, inert organic liquid medium to form a prepolymer; and (2) contacting the prepolymer with an aqueous solution of water-soluble acid acceptor to complete the polymerization reaction. These patents are as follows:

U.S. Pat. No. 3,640,970 discloses a two-step precondensate process for preparing aromatic polyamides, which is sometimes referred to as the oligomer polymerization process. In the first step of the process an aromatic diamine is reacted with an aromatic dicarboxylic acid dihalide in a polar, non-basic, inert organic liquid medium under conditions such that a condensation product having a low degree of polymerization is formed. In a second step the organic liquid medium containing the condensation product is contacted with an aqueous solution of a water-soluble acid acceptor to form the polyamide product.

Ethers, ketones, sulfones, and halogenated hydrocarbons are suggested as being suitable solvents. Water-soluble acid acceptors suited for neutralizing by-product hydrohalide acid include inorganic and organic alkali-metal hydroxides, carbonates and bicarbonates as well as organic amines, e.g., triethylamine and triethylenediamine. Inherent viscosities for the product polyamides of 0.6 to 3 in sulfuric acid were deemed possible.

U.S. Pat. No. 4,009,154 discloses almost the same two-step precondensate process disclosed in the '970 patent, except that the water-soluble acid acceptor is limited to an aqueous slurry consisting of a dispersion in water of a sodium carbonate hydrate. It was recognized in the '154 patent that when one attempted to practice the process of the '970 patent with an organic liquid medium containing the aromatic diamines and aromatic dicarboxylic acid halides in high concentration in order to improve efficiency, only aromatic polyamides of a low degree of polymerization could be obtained.

The processes of U.S. Pat. Nos. 3,640,970 and 4,009,154 are not conducive to large-scale continuous operation. Either the reaction is run too slowly resulting in polyamides of a low degree of polymerization, or these processes require very large pumps, very vigorous stirring, and very large process relief valves. Operation in this manner is not efficient and has associated safety concerns.

Therefore, there exists a need in the art for a continuous process that is (1) capable of efficiently producing polyamides of a high degree of polymerization; and (2) does not suffer from limitations on the nature of the introduction of the acid acceptor.

BRIEF SUMMARY OF THE INVENTION

In the first step an oligomer polymerization process an aromatic and/or non-aromatic diamine is reacted with an aromatic and/or non-aromatic dicarboxylic acid dihalide in a polar, non-basic, inert organic liquid medium under conditions such that a condensation product having a low degree of polymerization is formed. Hereinafter the condensation product having a low degree of polymerization may be referred to as the "prepolymer." In the second step, the organic liquid medium containing the prepolymer, hereinafter referred to as a "prepolymer solution," is contacted with an aqueous solution of a water-soluble acid acceptor to form a polyamide product having a high degree of polymerization by continuously feeding the prepolymer and the acid acceptor solutions into a reactor system. The reactor system has a total residence time from about 2 seconds to about 2 minutes and a Peclet number greater than about 3.5. This process efficiently produces polyamides having a high degree of polymerization. As compared to the prior art process, it uses very fast addition times. In the prior art, such fast addition time would have required very large pumps and process relief valves, and would have had associated efficiency and safety concerns. The process of the invention does not suffer from these disadvantages.

Without wanting to be bound by any particular theory it is believed that a reactor system having a total residence time from about 2 seconds and about 2 minutes and characterized by a Peclet number greater than about 3.5 has reduced back mixing and/or dispersion of the prepolymer and water-soluble acid acceptor as compared to the processes previously used for polyamide production. Therefore, the process helps minimize hydrolysis of the acid chloride of the prepolymer, which hydrolysis can lead to polyamides having a low degree of polymerization.

The polyamides obtained by the process of the present invention can be transformed, as required, in any customary manner into various forms, for example, fibers, films, sheets, liquid products, and shaped articles which can be used for a variety of purposes, such as for example, industrial materials, insulating materials, resin-reinforced materials, adhesives, coatings, and the like.

In accordance with the purpose of the invention, as embodied and broadly described herein, the invention comprises a process for preparing polyamides comprising feeding solutions of:

(a) at least one aqueous solution of at least one water-soluble inorganic acid acceptor; and (b) at least one prepolymer solution comprising at least one prepolymer and at least one polar, non-basic and inert organic liquid medium, wherein the at least one prepolymer is formed by reacting substantially equimolar amounts of at least one diamine and at least one dicarboxylic acid dihalide in the at least one polar, non-basic and inert organic liquid medium;

into a reactor system having a residence time of from about 2 seconds to about 2 minutes, and having a Peclet number greater than about 3.5.

Further in accordance with the purpose of the invention, as embodied and broadly described herein, the invention comprises a process for preparing polyamide comprising feeding solutions of (a) at least one aqueous solution of at least one water-soluble inorganic acid acceptor; and (b) at least one prepolymer solution comprising at least one prepolymer and at least one polar, non-basic and inert organic liquid medium, wherein the at least one prepolymer is formed by reacting substantially equimolar amounts of at least one diamine and at least one dicarboxylic acid dihalide in the at least one polar, non-basic and inert organic liquid medium;

into a reactor system having a Peclet number greater than about 3.5 and wherein there is about 95% or more conversion of the total amount of the at least one prepolymer in from about 2 seconds to about 2 minutes of residence time in said reactor system.

Further in accordance with the purpose of the invention, as embodied and broadly described herein, the invention comprises a shaped article and/or a fiber formed from at least one polyamide produced according to these processes.

Further scope of applicability of the present invention will become apparent from the detailed description given hereinafter. However, it should be understood that the detailed description and specific examples, while indicating embodiments of the invention, are given by way of illustration only, because various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

DETAILED DESCRIPTION OF THE INVENTION

The process of the invention uses prepolymer solution(s) comprising at least one polar, non-basic and inert organic liquid medium, and at least one prepolymer formed by reacting substantially equimolar amounts of at least diamine and at least one dicarboxylic acid dihalide in the at least one polar, non-basic and inert organic liquid medium.

When substantially equimolar amounts of dicarboxylic acid dihalides and diamines are reacted in at least one polar, non-basic and inert organic liquid medium, a condensation product of the diamine and the dicarboxylic acid dihalide having a low degree of polymerization is formed. The condensation product having a low degree of polymerization may also be referred to herein as the "prepolymer."

The prepolymer(s) obtained by the reaction take the form of a solution or a dispersion in the organic liquid medium. The prepolymers may be partly present as solid fine particles or swollen particles in the dispersed phase. The dicarboxylic acid dihalides and diamines may be partly present as unreacted dicarboxylic acid dihalides or as a hydro-halic salt of the diamine. The significant characteristic is that the prepolymer(s) in the state of dispersion as well as solution retain a potential of further polycondensation.

According to the invention, the prepolymer, the at least one polar, non-basic and inert organic liquid medium, any unreacted dicarboxylic acid dihalides and diamines, and any other constituents are referred to collectively herein as a "prepolymer solution."

It is believed that the prepolymer is predominately an assembly of homologous molecules that have a degree of condensation of about 1 to 20 or more, if a prepolymer of one molecule of the dicarboxylic acid dihalides and one molecule of the diamine is defined as having a degree of condensation of 1.

During the reaction of the dicarboxylic acid dihalides and diamines, hydrohalic acid is liberated. It is believed that the terminal amine end of the prepolymer is in the form of a hydrohalic salt. The prepolymer solution obtained therefore can be stored stably for a long period of time depending on storage conditions. In one embodiment, the prepolymer solution can be stored for at least 6 hours.

Both aliphatic and aromatic diamines can be used as the diamines according to the invention. In order to obtain polyamides having excellent heat stability and resistance to organic solvent(s), diamines expressed by the following Formula 1 or 2 are suitably used $$H_2N\text{-}A\text{-}NH_2 \quad (1)$$

or $$H_2N\text{-}A\text{-}Y\text{-}A'\text{-}NH_2 \quad (2)$$

In the foregoing formulae, two amino groups are bonded to carbon atoms not adjacent to each other, excepting a case where they are at the peri-position of the naphthalene nucleus. -A- and -A'- may be the same or different, and represent a divalent carbocylic aromatic nucleus, including a case where one or more hydrogen atoms of its aromatic nucleus are replaced by a substituent not reactive under the reaction conditions involved with an acid halide group or amino group. The carbocylic aromatic nucleus includes, for example, benzene, naphthalene, and biphenyl. The non-reactive substituents include for example halogen, lower alkyl, phenyl, acyl, acryloxyl, alkoxycarbonyl, nitro, disalkylamino, acylamino and alkylthio groups which do not react with the acid halide and amine. The non-reactive substituents also include for example carboxyl, sulfonic acid, and mono-substituted amino groups which react with the acid halide far more slowly than with the amino group. The position or number of substituents is determined so that the reactivity of the two amino groups of the diamines with the acid halide may not be impeded, and the reactivities of two amino groups may not differ too much. —Y— in the foregoing Formula 2 is a member which connects adjoining aromatic nuclei, and represents, for example, ether, thioether, carbonyl, sulfone, N-substituted imino, amide, N-substituted amide, methylene and alkylidene linkages which are non-reactive with the acid halide.

As the aromatic diamines expressed by the foregoing Formulae 1 and 2, there can be mentioned, for instance, benzene derivatives, such as metaphenylene diamine, 2,4 diamino mesitylene, para-phenylene diamine, chlorophenylene diamine, toluylene diamine, diamino acetophenone, amino anisidine, benzidine, 1,5-naphthylene diamine, bis (aminophenyl) ether, N,N-bis(4-aminophenyl) aniline, and bis(amino-phenyl) methane. In one embodiment metaphenylene diamine and/or 2,4 diamino mesitylene are preferred.

Aliphatic diamines that may be used in the process of the invention may have one or more substituents not reactive under the reaction conditions involved with an acid halide group or amino group. The non-reactive substituents include, for example, halogen, lower alkyl, phenyl, acyl, acryloxyl, alkoxycarbonyl, nitro, disalkylamino, acylamino and alkylthio groups which do not react with the acid halide and amine. The non-reactive substituents also include for example carboxyl, sulfonic acid, and mono-substituted amino groups which react with the acid halide far more slowly than with the amino group. The position or number of substituents is determined so that the reactivity of the two amino groups of the diamines with the acid halide may not be impeded, and the reactivities of two amino groups may not differ too much. Non-limiting examples of aliphatic diamines include n-methylene diamines, such as hexamethylene diamine.

In one embodiment two or more diamines may be used in combination. In another embodiment up to about 15 percent by weight, based on the total weight of all diamine, of one or more non-aromatic diamines is used in combination with one or more aromatic diamines.

Both aliphatic dicarboxylic acid dihalides and aromatic dicarboxylic acid dihalides may be used in the invention. To obtain polyamides having excellent heat resistance and resistance to solvent(s), one or more aromatic dicarboxylic acid dihalides expressed by the following Formula 3 or 4 are suitably employed.

$$XOC\text{—}B\text{—}COX' \quad (3)$$

$$XOC\text{—}B\text{—}Y\text{—}B'\text{—}COX' \quad (4)$$

In the foregoing formulae, X and X' represent a halogen atom, usually a chlorine atom. Two acid halide groups are bonded to carbon atoms not adjacent to each other. But a case where they are at the peri-position of the naphthalene nucleus is excluded as it generally does not give good results. —B— and —B'—, like -A- and -A'- described above for Formulae 1 and 2, represent a carbocylic aromatic nucleus, including a case where one or more hydrogen atoms of its aromatic nucleus is replaced by a substituent not reactive with an amino group or acid halide group. The carbocylic aromatic nucleus includes, for example, benzene, naphthalene, and biphenyl. Non-reactive substituents include for example halogen, low alkyl, phenyl, acyl, acyloxyl, alkoxycarbonyl, nitro, dialkylamino, and alkylthio groups which do not react with the acid halide and amine. Other substituents, which react with the amine far more slowly than with the acid halide may be used, such as, for example carboxyl and sulfonic acid groups. The position or number of the substituents is determined so that the reactivity of two acid halide groups with the amine may not be impeded, and the reactivities of two acid halide groups should not differ too much. —Y— in the foregoing Formula 4 is a member which connects adjoining aromatic nuclei, and represents for example ether, thioether, carbonyl, sulfone, N-substituted imino, amide, N-substituted amide, methylene and alkylidene linkages which are non-reactive with the acid halide or amine.

Typical, and in no way limiting, examples of aromatic dicarboxylic acid halides are terephthaloyl chloride, isophthaloyl chloride, 1,4-naphthaleneicarboxylic acid halide, 2,6-naphthalenedicarboxylic acid halide, 4,4'-biphenyldicarboxylic acid halide, 5-chloroisophthaloyl chloride, 5-methoxyisophthaloyl chloride, and bis(para-chloroformylphenyl) ether. In one embodiment the dichlorides of terephthalic acid and isophthalic acid are preferred.

The dihalides of aliphatic dicarboxylic acids used in the invention are, for example, expressed by the following Formula 5:

$$XOC\text{—}R\text{—}COX' \quad (5)$$

wherein R is an alkylene group having 4 to 10 carbon atoms, and X and X' are a halogen atom, preferably a chlorine atom. Non-limiting examples of aliphatic dicarboxylic acids dihalides are dihalides of adipic acid, and sebacic acid. The dichlorides of adipic acid, and sebacic acid are preferred. Dihalides of aliphatic dicarboxylic acids used in the invention may have one or more substituents not reactive with an amino group or acid halide group. Non-reactive substituents include for example halogen, low alkyl, phenyl, acyl, acyloxyl, alkoxycarbonyl, nitro, dialkylamino, and alkylthio groups which do not react with the acid halide and amine. Other substituents, which react with the amine far more slowly than with the acid halide may be used, such as, for example carboxyl and sulfonic acid groups. The position or number of the substituents is determined so that the reactivity of two acid halide groups with the amine may not be impeded, and the reactivities of two acid halide groups should not differ too much.

In one embodiment two or more dicarboxylic acid dihalides may be used in combination. In another embodiment up to about 15 percent by weight, based on the total weight of all dicarboxylic acid dihalide(s), of one or more non-aromatic dicarboxylic acid dihalide(s) is used in combination with one or more aromatic diamine(s).

The organic liquid medium of the invention should in general be polar, non-basic and inert. The organic liquid medium should be non-basic because in general a basic organic medium is capable of dissolving the polyamides produced by the process of the invention, which results in difficulty in controlling the polymerization reaction and in separating the resulting polyamides from the organic liquid medium. The term "polar" used in relation to the organic liquid medium means that the organic liquid medium used in the present invention has at least some degree of mutual solubility in water. The term "inert" used in relation to the organic liquid medium means that the organic liquid medium does not substantially react with either the diamine or the dicarboxylic acid dihalide.

Organic liquid mediums that more or less swell the resulting polymers are preferable as the organic liquid medium of the invention. In general, compounds that dissolve the resulting polymers do not give satisfactory results.

Non-limiting examples of organic solvents usable in the invention as the organic liquid medium are ethers such as diethyl ether, tetrahydrofuran, dioxane, ethylene glycol dimethyl ether, anisole, metanitro anisole and parachloroanisole, ketones, sulfones, halogenated hydrocarbons, nitriles, nitro compounds, and/or esters. Tetrahydrofuran is a preferred organic medium.

Non-limiting examples of ketones usable in the invention as the organic liquid medium are acetone, methyl ethyl ketone, methyl isobutyl ketone, cyclohexanone, acetophenone, parachloroacetophenone, and orthonitroacetophenone. Non-limiting examples of sulfones usable in the invention as the organic liquid medium are sulfolane, 2,5-dimethyl sulfolane and 3-methylsulfolane. Non-limiting examples of halogenated hydrocarbons usable in the invention as the organic liquid medium are methylene chloride, chloroform, 1,2-dichloroethane, α-chloronaphthalene and chlorobenzene. Non-limiting examples of nitriles usable in the invention as the organic liquid medium are acetonitrile, propionitrile, and benzonitrile. Non-limiting examples of nitro compounds usable in the invention as the organic liquid medium are nitrobenzene, nitrotoluene, and metanitroanisole. Non-limiting examples of ester compounds usable in the invention as the organic liquid medium are ethyl acetate and methyl benzoate.

The organic liquid medium of the invention need not be a single compound, but may be a mixture comprising one or more organic solvents and optionally one or more diluents or other ingredients. It is preferable in principle that this organic liquid medium should not contain a substance reactive with the dicarboxylic acid dihalides and diamines. Such reactive substance includes, for example, water, ammonia, basic substances, acidic substances, alcohols, isocyanates, and acid halides. The addition of a monofunctional reactive substance in a prescribed amount, however, may at times be effective for molecular weight adjustment or terminal group control to improve the practical properties of the resulting polymer. Usually, the amount is limited to less than about 1% by weight.

In one embodiment, one or more non-polar solvents or non-polar hydrocarbons may be added to the organic liquid medium as a diluent. The total amount of non-polar diluents added should be no more than about 30% by weight based on the total weight of the liquid medium. Non-limiting examples of such non-polar hydrocarbons are benzene, cyclohexane, toluene, and xylene. A non-limiting example of a non-polar solvent is carbon tetrachloride.

The organic liquid medium should be selected in relation to the composition of an aqueous solution phase under polymerization conditions. For example, good results may be obtained when the organic liquid medium is such as to provide a transparent solution or a stable, smooth emulsion at the time the prepolymer is formed. On the other hand, it is not desired to select an organic liquid medium where at the time the prepolymer is formed there are formed particles that precipitate rapidly or where a tacky precipitate is formed. Organic liquid medium(s) comprising mixtures of one or more organic solvents or diluents may be advantageous in searching for an optimum medium, which may give a polymer having a high degree of polymerization.

Any manner of mixing and mix order of adding the dicarboxylic acid dihalides and diamines may be used. In one embodiment, a solid dicarboxylic acid halide or a solution of such acid halide in an organic liquid medium is added to a solution of the diamine in an organic liquid medium. In another embodiment a solid diamine or a solution of diamine in an organic liquid medium may be added to solution of the dicarboxylic acid dihalide in an organic liquid medium. At this time, an especially rapid stirring is not necessary, and no one specified rate of addition is required. For instance, whether total amounts of these materials are charged within several seconds, or whether they are charged over a period of fifty minutes or more, there is no substantial difference in the resulting prepolymers.

However, it is preferred that the concentrations of the reactants, the order of their addition, the rate of their addition, or the rate of stirring should be chosen so that a homogeneous stable solution or dispersion of prepolymer in the organic liquid medium, also known as the prepolymer solution, will be obtained upon contacting the dicarboxylic acid dihalides, diamines and organic liquid medium. In one embodiment the temperature for this reaction is usually from about −30 to about 100° C. In yet another embodiment the temperature for this reaction is from about 0 to about 100° C. In yet another embodiment the temperature for this reaction is from about 10 to about 40° C. In yet another embodiment, the reaction is carried out at room temperature. It should be noted that the reaction proceeds even at a temperature below 0° C. In one embodiment the temperature for this reaction is from about −30 to about 0° C.

In one embodiment the diamine comprises from 0 to 100% by weight metaphenylene diamine and from 0 to 100% by weight 2, 4 diamino mesitylene, and the dicarboxylic acid dihalide comprises from 0 to 100% by weight isophthaloyl chloride and from 0 to 100% by weight terephthaloyl chloride.

In another embodiment the diamine comprises from 0 to 100% by weight metaphenylene diamine and/or from 0 to 100% by weight 2, 4 diamino mesitylene and up to about 15 percent by weight, based on the total weight of all diamine, of one or more non-aromatic diamines. The dicarboxylic acid dihalide comprises from 0 to 100% by weight isophthaloyl chloride and/or from 0 to 100% by weight terephthaloyl chloride and up to about 15 percent by weight, based on the total weight of all dicarboxylic acid dihalides, of one or more non-aromatic dicarboxylic acid dihalides.

In another embodiment the diamine is metaphenylene diamine, and the dicarboxylic acid dihalide is isophthaloyl chloride.

In another embodiment the diamine is 2, 4 diamino mesitylene, and the dicarboxylic acid dihalide is isophthaloyl chloride.

In another embodiment the diamine is metaphenylene diamine, and the dicarboxylic acid dihalide comprises about 40% by weight isophthaloyl chloride and about 60% by weight terephthaloyl chloride.

In another embodiment the diamine is metaphenylene diamine, and the dicarboxylic acid dihalide comprises about 70% by weight isophthaloyl chloride and about 30% by weight terephthaloyl chloride.

In another embodiment the diamine is about 50% by weight metaphenylene diamine and about 50% by weight 2, 4 diamino mesitylene, and the dicarboxylic acid dihalide comprises about 70% by weight isophthaloyl chloride and about 30% by weight terephthaloyl chloride.

In another embodiment the organic liquid medium of all of the preceding embodiments comprises tetrahydrofuran.

In another embodiment, where copolymerization is desired, the prepolymer solution may be prepared by either procedure (1) or (2) mentioned below:

(1) At least two diamines and/or at least two dicarboxylic acid dihalides are simultaneously or in an optional order added to an organic liquid medium to form a prepolymer product having a low degree of polymerization; or, (2) Substantially equimolar amounts of at least one diamine and at least one dicarboxylic acid dihalide are reacted in an organic liquid medium to form a prepolymer product of said diamine and dicarboxylic acid dihalide having a low degree of polymerization; separately, substantially equimolar amounts of at least one diamine and at least one dicarboxylic acid dihalide at least one of which is different in kind from the first-mentioned diamine and dicarboxylic acid dihalide are reacted in an organic liquid medium which is the same as, or different from, said organic liquid medium to form a prepolymer product having a low degree of polymerization. In one embodiment the two or more prepolymers are combined to form prepolymer solution of the organic liquid media containing the prepolymers. In another embodiment, the two or more prepolymers are separately fed into the reactor system.

The invention is not limited as to when the prepolymer solution is made or prepared. Therefore, the process of the invention may be carried out by using stored quantities of prepolymer solution or the prepolymer solution may be produced just prior to introduction into the reactor system.

In the second step of the two-step precondensate process, or oligomer polymerization process, the prepolymer solution is contacted with at least one aqueous solution of at least one water-soluble acid acceptor to complete the intended polyamide-forming reaction. In one embodiment, the at least one prepolymer solution is contacted with at least one aqueous solution of at least one water-soluble acid acceptor by continuously feeding the components into a reactor system having a total residence time from about 2 seconds and about 2 minutes and having a Peclet number greater than about 3.5.

In another embodiment, the at least one prepolymer solution is contacted with at least one aqueous solution of at least one water-soluble acid acceptor by continuously feeding the components into a reactor system having a Peclet number greater than about 3.5 and where there is about 95% or more conversion of all the prepolymer in from about 2 seconds to about 2 minutes of residence time in said reactor system. By 95% or more conversion of prepolymer, it is meant that at least 95% or more the reactive groups of all prepolymer molecules have reacted with other reactive groups on other prepolymer molecules.

In one embodiment, the at least one prepolymer solution is fed into the reactor system at a temperature of about −5° C. and the at least one aqueous solution of at least one water-soluble acid acceptor is fed into the reactor system at a temperature of about 5–10° C.

The usable acid acceptors may be inorganic or organic so long as they are water-soluble. Inorganic acid acceptors are preferable. As the inorganic acid acceptors, water-soluble strong bases or weak bases may be used. Non-limiting examples of strong bases include, for instance, alkali metal hydroxides, such a lithium hydroxide and sodium hydroxide. Non-limiting examples of weak bases, include, for instance, carbonates or bicarbonates of alkali metals, such as sodium carbonate, potassium carbonate, and sodium bicarbonate. Bicarbonates are preferred, but carboxylic acid salts, such as sodium acetate, monopotassium oxalate, and dipotassium phthalate, are also usable. Hydroxides of alkaline earth metals and salts of weak acids may also be used. Non-limiting examples of organic acid acceptors include tertiary amines, especially preferred being trimethyl amine, triethyl amine, triethylene diamine, quinuclidine, N-methylmorpholin, and hexamethylene tetramine. In cases where the solubility of the tertiary amines is not high enough, a portion of the liquid medium aforementioned may be added to the aqueous phase.

The amount of the acid acceptor should be sufficient to form a salt with a total amount of the hydrohalic acid that is generated from the polycondensation. Generally, however, a slight excess or lack of the amount of the acid acceptor does not greatly affect the formation of a polymer.

The reactor system of the present invention can take the form of a variety of engineering devices, such as, for example, reactors in series, inline mixers, or tubular reactors with low axial dispersion. The reactor system can also comprise a combination of different engineering devices. In one embodiment, the reactor system has a total residence time of from about 2 seconds to about 2 minutes, and a Peclet number greater than about 3.5. In another embodiment, the reactor system has a Peclet number greater than about 3.5 and there is about 95% conversion of the prepolymer in from about 2 seconds to about 2 minutes of residence time in said reactor system.

The Peclet number (Pe) is a measure of axial backmixing within a reactor system as defined by the following equation for a tubular reactor:

$$Pe = uL/D$$

where: u=velocity, L=length, and D=axial dispersion coefficient. The Peclet number is inversely proportional to axial back-mixing and is a measure of the approach to plug flow, with a Peclet number of infinity corresponding to perfect plug flow. In a system with high axial dispersion (back-mixing) the Peclet number is zero.

For a reactor system that is not a tubular reactor, an equivalent Peclet number is calculated so that the residence time distribution of the system in question is the same as would be seen for a tubular reactor of the same Peclet number. The calculation and selection of an optimum Peclet number for a particular reactor system and other design considerations should be apparent to those skilled in the art. One non-limiting example of the calculation of the Peclet number for a reactor system comprising one or more continuously stirred tank reactors (CSTR) in series is disclosed in C. G. Hill, Jr, *An Introduction to Chemical Engineering Kinetics & Reactor Design* (Wiley 1977). Hill discloses the following equation:

$$\left[\frac{dF(t)}{d(t/\bar{t})}\right]_{t/\bar{t}} = \frac{1}{2}\sqrt{\frac{uL}{D\pi}}$$

since uL/D is=Pe (Peclet number) this equation may be rewritten as $$Pe = \pi\left(2\left[\frac{dF(t)}{d(t/\bar{t})}\right]_{t/\bar{t}}\right)^2$$

Hill also discloses approximate values for $$\left[\frac{dF(t)}{d(t/\bar{t})}\right]_{t/\bar{t}}$$

for a given number "n" of CTSRs in series. From this information an approximate Peclet number for reactor systems comprising "n" CTSRs in series can be determined:

| Number of CSTRs (n) | Approximate Value of $\left[\frac{dF(t)}{d(t/\bar{t})}\right]_{t/\bar{t}}$ | Approximate Peclet number (Pe) for Reactor System |
|---|---|---|
| 1 | .368 | 1.7 |
| 2 | .541 | 3.7 |
| 3 | .672 | 5.7 |
| 4 | .781 | 7.7 |
| 5 | .877 | 9.7 |
| n > 5 | $\sqrt{\frac{n}{2\pi}}$ | =2 * n |

In accordance with the present invention, axial backmixing is effectively minimized when the Peclet number greater than about 3.5. Although Peclet numbers of greater than about 3.5 are more than satisfactory, the Peclet number should preferably be as high as possible, consistent with other reaction conditions. In one embodiment, the reactor system has a Peclet number greater than about 5.5. In another embodiment, the reactor system has a Peclet number greater than about 20. In yet another embodiment, the reactor system has a Peclet number greater than about 40.

The prepolymer solution and aqueous solution of water-soluble acid acceptor can be introduced into the reactor system by any method so long as both can be brought into intimate contact with each other in the reactor system. For instance, an aqueous solution of an acid acceptor may be added to the prepolymer solution, or vice versa. In one embodiment they may be mixed by spraying or injecting them from a nozzle at the same time. In another embodiment, the prepolymer solution and the aqueous solution of the acid acceptor are mixed in a centrifugal pump. In addition more than one prepolymer solution and/or more than one aqueous solution of water-soluble acid acceptor may be fed to the reactor system at the same time.

In one embodiment, the reactor system reactor comprises at least two well-stirred tank reactors in series, each independently having a residence time of less than about 30 seconds. In another embodiment, the reactor system reactor comprises at least three well-stirred tank reactors in series, each independently having a residence time of less than about 30 seconds.

In another embodiment, the reactor system comprises a mixing apparatus followed by a pipe. In yet another embodiment, the reactor system reactor comprises a centrifugal pump followed by a pipe. In another embodiment, the pipe is about 1" in diameter and has a length of about 120 feet. In another embodiment, the flow in the pipe is turbulent.

Figure 1:
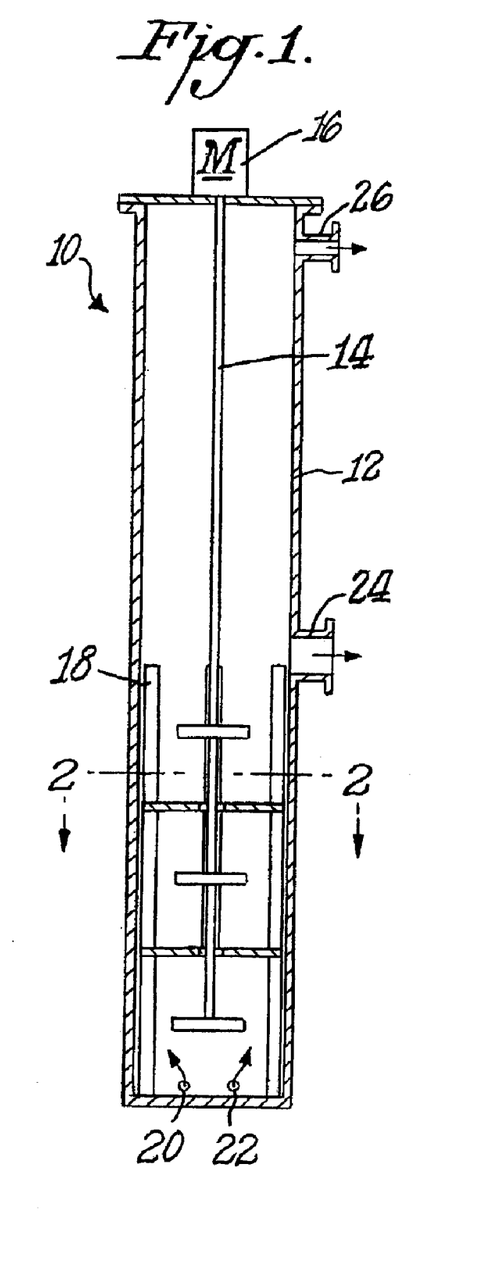
FIG. 1 is a cross sectional elevation of one embodiment of a reactor system for carrying out a process for preparing polyamides.
Figure 2:
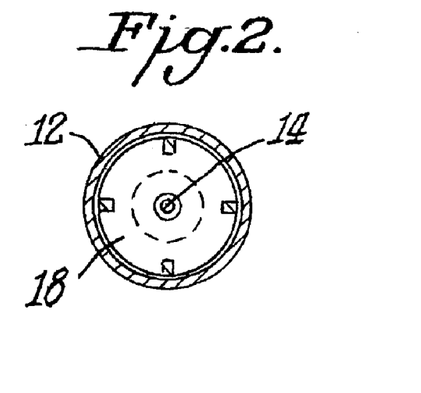
FIG. 2 is a cross sectional plan view taken along line 2—2 of FIG. 1.

Another embodiment of a reactor system 10 usable for the invention is shown in FIGS. 1 and 2. This reactor system 10 comprises a pipe 12, fitted with an impeller system 14, which is attached to a variable speed motor 16. The impeller system 14 spins freely inside a baffle cage 18. The reactor system 10 is fitted with at least two flanged inlets 20 and 22, and at least two flanged outlets 24 and 26. In operation the prepolymer solution is continuously fed into the reactor system 10 through flanged inlet 20 and the aqueous solution of water-soluble acid acceptor is continuously fed into the reactor system 10 through flanged inlet 22. During operation, the impellor system 14 is turned by motor 16 inside baffle cage 18 so as to create a turbulent flow of the prepolymer solution and aqueous solution of water-soluble acid acceptor inside the pipe 12. The product from the reaction system 10 is continuously withdrawn from flanged outlet 24. Any gases evolved during the polymerization of the prepolymer are withdrawn from flanged outlet 26.

The product from the reaction system according to the process of the invention is preferably a dispersion of an insolubilized polymer in a two-phase system or in a continuous homogeneous phase. The resulting polymer can be easily recovered by filtration or through the use of a centrifuge. The spent organic liquid medium is recovered when necessary. The separated polymer attains a grade sufficiently practical being free from inorganic impurities by simple wash with water or hot water.

The inherent viscosity of a polymers, $\eta_{inh}$, is the ratio of the natural logarithm of the relative viscosity to the mass concentration of the polymer. According to the invention, it is possible to produce polyamides having inherent viscosities of at least about 0.8 deciliters per gram (dl/g) or more, preferably more than 1.1 dl/g, as measured with respect to a solution of 0.5 g of the polymer in 100 ml of concentrated sulfuric acid at 25° C. Unless otherwise specified, the inherent viscosity of each of the prepolymers and the final polyamides obtained in the examples was measured in accordance with this method. In one embodiment the polyamides having a high degree of polymerization have an inherent viscosity of at least about 2.2 dl/g. In another embodiment the polyamides having a high degree of polymerization have an inherent viscosity of at least about 3.0 dl/g.

Polyamide polymers obtained by the process of the present invention can be used in various forms, such as, for example, fibers, films, and solutions. They may also take the form of shaped articles. In the form of fibers, they may be incorporated into curtains, carpets, interior decoration articles, or industrial materials which are to be exposed for a long time to high temperatures, such as tires, conveyor belts, ropes, filters, gaskets and electric insulating cloths, and also protecting wears or working wears for people who work under such working environments. In the form of hollow fibers, said materials are useful in liquid and gas separation membranes. As a film, the polyamides are useful as the lining and surface materials for electric and electric components, automobiles and aircraft, as packaging materials for articles to be exposed to high temperatures and high energy irradiation, and also as lining and laminating materials for anti-corrosive valves, and high temperature gas treating apparatus. The solutions of the polymers obtained according to the present invention are valuable as varnishes, adhesives, wire enamel, and covering materials for woven fabrics because of their excellent resistance to solvent and heat, and excellent flame retardant properties.

The process of the invention will be further described below with reference to the working examples. It should be noted however that the concept of the invention will not be limited at all by these examples.

EXAMPLES

Example 1

A prepolymer solution was prepared by reacting 0.3599 moles (38.92 g) of metaphenylene diamine with 0.1085 moles of terephthaloyl chloride and 0.2533 moles of isophthaloyl chloride (total mass of 73.46 g) in 1200 ml of tetrahydrofuran.

An aqueous solution of a water-soluble inorganic acid acceptor was prepared by adding 44.7 g of sodium carbonate to 500 ml of deionized water.

A reactor system comprising three well-stirred reactors in series was constructed. The three well-stirred reactors comprised three vessels having estimated liquid volumes of 5, 4, and 9 ml respectively. Stirbars were added to each vessel to provide a means of mixing the contents of the vessels. The three vessels were connected so that material added to the first vessel overflowed to the second vessel and the material from the second vessel overflowed to the third vessel. Overflow from the third vessel overflowed to a first receiving flask until it was full, at which time is was replaced with a second receiving flask. The receiving flasks had volumes of 250 ml and were equipped with stir bars to allow for subsequent stirring of the receiving flask contents.

The aqueous solution of a water-soluble inorganic acid acceptor and the prepolymer solutions each were fed at 30 ml/min to the first vessel. The prepolymer solution was fed from a stirred jacketed glass flask cooled by chilled glycol to 3° C., while the water-soluble inorganic acid acceptor was fed from a glass flask. The first receiving flask was allowed to fill until full, at which time the second receiving flask was used to receive the overflow from the third vessel. The receiving flasks were allowed to stir for at least 30 minutes prior to recovering material. The polyamide was recovered by filtering, washing, refiltering and then drying. The operation was continued until the aqueous solution of the water-soluble inorganic acid acceptor was exhausted.

The resulting polyamide had an inherent viscosity of 1.9 to 2.2 dl/g as measured with respect to a solution of 0.5 g of the polymer in 100 ml of concentrated sulfuric acid at 25° C.

Example 2a

Reactor System of Three CSTRs

An aqueous solution of a water-soluble inorganic acid acceptor was prepared by dissolved 102 g of sodium carbonate (from Aldritch Chemical) in 2.0 liters of deionized water. The solution was then chilled and kept between 5 and 10° C.

A prepolymer solution was prepared by adding (i) a solution of 51.419 g isophthaloyl chloride and 22.037 g terephthaloyl chloride (both obtained from E.I. Du Pont de Nemours) in 800 ml of tetrahydrofuran (from Aldritch) to (ii) a solution of 38.934 g of metaphenylene diamine (obtained from E.I. Du Pont de Nemours) in 400 ml of tetrahydrofuran over the course of 40 minutes at a reaction temperature of −5° C.

A reactor system comprising three well-stirred reactors in series was constructed. The three well-stirred reactors comprised three vessels having measured liquid volumes of 50, 70, and 50 ml respectively. The first vessel consisted of a vacuum flask head mounted to a three-way adapter, while the second and third vessels were 100 ml beakers mounted on an angle. The vessels were stirred with air driven stirrers with turbine type stirring. The three vessels were connected in series so that material added to the first vessel overflowed to the second vessel and the material from the second vessel overflowed to the third vessel. Overflow from the third vessel overflowed to a receiving flask.

The aqueous solution of a water-soluble inorganic acid acceptor and the prepolymer solutions each were fed at 75 ml/min to the first vessel. Calculated residence times were 20, 28, and 20 seconds for the first, second and third reactors respectively. The reactor system therefore had an overall residence time of about 68 seconds. The reactor system was given two minutes to stabilize, and then a three-minute sample was taken from the overflow from the third vessel.

The resulting polyamide had an inherent viscosity of 1.63 dl/g as measured with respect to a solution of 0.5 g of the polymer in 100 ml of concentrated sulfuric acid at 25° C.

Example 2b

Reactor System of Two CSTRs

A prepolymer and aqueous solution of a water-soluble inorganic acid acceptor solution were prepared as in Example 2a. The third vessel of Example 2a was removed so that the reactor system comprised two well-stirred reactors in series. The two well-stirred reactors comprised two vessels having liquid volumes of 50 and 70 ml respectively. The vessels were stirred with air driven stirrers with turbine type stirring. The two vessels were connected in series so that material added to the first vessel overflowed to the second vessel and the material from the second vessel overflowed to a receiving flask.

The aqueous solution of a water-soluble inorganic acid acceptor and the prepolymer solutions each were fed at 50 ml/min to the first vessel. Calculated residence times were 30 and 42 seconds for the first and second reactors respectively. The reactor system therefore had an overall residence time of about 72 seconds. The reactor system was given two minutes to stabilize, and then a three-minute sample was taken from the overflow from the second vessel.

The resulting polyamide had an inherent viscosity of 1.45 dl/g as measured with respect to a solution of 0.5 g of the polymer in 100 ml of concentrated sulfuric acid at 25° C.

Example 2c

Reactor System of One CSTR (Comparison)

A prepolymer and aqueous solution of a water-soluble inorganic acid acceptor solution were prepared as in Example 2a. The second and third vessels of Example 2a were removed so that the reactor system comprised a single well-stirred reactor having a liquid volume of 50 ml. The vessel was stirred with an air driven stirrer with turbine type stirring. The reactor system was constructed so that material added to the first vessel overflowed to a receiving flask.

The aqueous solution of a water-soluble inorganic acid acceptor and the prepolymer solutions each were fed at 25 ml/min to the first vessel. The calculated residence time was sixty seconds for the vessel. The reactor system was given two minutes to stabilize and then a three-minute sample was taken from the overflow from the first vessel.

The resulting polyamide had an inherent viscosity of 0.97 dl/g as measured with respect to a solution of 0.5 g of the polymer in 100 ml of concentrated sulfuric acid at 25° C.

Example 3

Pipeline Reactor System

An aqueous solution of a water-soluble inorganic acid acceptor was prepared by dissolved 97 lbs of sodium carbonate in 834 lbs of deionized water. The solution was then chilled to 10° C.

Next, a solution of 72.4 lbs of isophthalloyl chloride, 37.0 lbs of terephthalloyl chloride (both materials from Twin Lakes Chemical), 1.16 lbs of benzoyl chloride (from Aldritch) in 587 lbs of tetrahydrofuran (from DuPont) was prepared. Then a solution of 55.3 lbs of metaphenylene diamine (from Du Pont) in 491 lbs of tetrahydrofuran was added to the first solution of phthalloyl chloride so as to keep the reaction temperature below 5° C. The combined solution is the prepolymer solution.

The prepolymer solution was metered into a Goulds LF3196 1×1.5–8 centrifugal pump at 3.95 gallons per minute and the aqueous solution of water-soluble inorganic acid acceptor was metered into same centrifugal pump at 2.24 gallons per minute. The outflow from centrifugal pump entered a 1" diameter stainless steel pipe having a length of about 120 feet.

The total residence time of the combined prepolymer and acid acceptor solution in the pipe was about 50 seconds. All of the prepolymer solution was pumped from the holding tank and treated in the above fashion. Collected polymer slurry was allowed to stir for fifteen minutes and then pumped into an aggressively stirred vessel with 1800 lbs of water. A sample was taken from this vessel, filtered and dried.

The resulting polyamide had an inherent viscosity of 1.32 as measured with respect to a solution of 0.5 g of the polymer in 100 ml of concentrated sulfuric acid at 25° C.

Example 4

Fiber

A solution of 3 g of the polyamide from Example 3 was dissolved in 12 g of N methyl pyrrolidone. 10 ml of the resulting solution was loaded into a 20 ml syringe and then extruded from the syringe at a rate of 7.5 ml/min into a stirred water bath and wound up as a continuous filament.

What is claimed is:

1. A process for preparing polyamide comprising continuously feeding solutions of
    (a) at least one aqueous solution of at least one water-soluble inorganic acid acceptor; and
    (b) at least one prepolymer solution comprising at least one prepolymer and at least one polar, non-basic and inert organic liquid medium, wherein the at least one prepolymer is formed by reacting substantially equimolar amounts of at least one diamine and at least one dicarboxylic acid dihalide in the at least one polar, non-basic and inert organic liquid medium;

into a reactor system having a residence time of from about 2 seconds to about 2 minutes, and having a Peclet number greater than about 3.5.

2. The process of claim 1, wherein the at least one diamine is at least one aromatic diamine, and the at least one dicarboxylic acid dihalide is at least one aromatic dicarboxylic acid dihalide.

3. The process of claim 2, wherein the at least one polar, non-basic and inert organic liquid medium is tetrahydrofuran.

4. The process of claim 2, wherein up to about 15 percent by weight, based on the total weight of all diamine, of one or more non-aromatic diamines is used in combination with the least one aromatic diamine, and/or up to about 15 percent by weight, based on the total weight of all dicarboxylic acid dihalides, of one or more non-aromatic dicarboxylic acid dihalides is used in combination with the at least one aromatic dicarboxylic acid dihalide.

5. The process of claim 1, wherein the at least one diamine is metaphenylene diamine, 2, 4 diamino mesitylene, or a mixture thereof, and the at least one dicarboxylic acid dihalide is terephthaloyl chloride, isophthaloyl chloride, or a mixture thereof.

6. The process of claim 1, wherein the at least one diamine is about 100 weight percent metaphenylene diamine, and the at least one dicarboxylic acid dihalide is about 100 weight percent terephthaloyl chloride, about 100 weight percent isophthaloyl chloride, a mixture of about 40 weight percent isophthaloyl chloride and about 60 weight percent terephthaloyl chloride, or a mixture of about 70 weight percent isophthaloyl chloride and about 30 weight percent terephthaloyl chloride.

7. The process of claim 1, wherein the at least one diamine is about 100 weight percent 2, 4 diamino mesitylene, and the at least one dicarboxylic acid dihalide is about 100 weight percent isophthaloyl chloride.

8. The process of claim 1, wherein the at least one diamine is about 50 weight percent metaphenylene diamine and about 50 weight percent 2, 4 diamino mesitylene and the at least one dicarboxylic acid dihalide is about 70 weight percent isophthaloyl chloride and about 30 weight percent terephthaloyl chloride.

9. The process of claim 1, wherein the reactor system comprises at least two well-stirred reactors in series.

10. The process of claim 1, wherein the reactor system comprises at least three well-stirred reactors in series, each independently having a residence time of less than about 30 seconds.

11. The process of claim 1, wherein the reactor system comprises a mixing apparatus followed by a pipe.

12. The process of claim 11, wherein the mixing apparatus is a centrifugal pump.

13. The process of claim 11, wherein the continuous feeding of (a) and (b) into the pipe forms a flow that is turbulent.

14. The process of claim 11, wherein the at least one diamine is at least one aromatic diamine, and the at least one dicarboxylic acid dihalide is at least one aromatic dicarboxylic acid dihalide.

15. The process of claim 14, wherein the at least one polar, non-basic and inert organic liquid medium is tetrahydrofuran.

16. The process of claim 11, wherein up to about 15 percent by weight, based on the total weight of all diamine, of one or more non-aromatic diamines is used in combination with at least one aromatic diamine, and/or up to about 15 percent by weight, based on the total weight of all dicarboxylic acid dihalides, of one or more non-aromatic dicarboxylic acid dihalides is used in combination with at least one aromatic dicarboxylic acid dihalide.

17. The process of claim 11, wherein the at least one diamine is metaphenylene diamine, 2, 4 diamino mesitylene, or a mixture thereof, and the at least one dicarboxylic acid dihalide is terephthaloyl chloride, isophthaloyl chloride, or a mixture thereof.

18. The process of claim 11, wherein the at least one diamine is about 100 weight percent metaphenylene diamine, and the at least one dicarboxylic acid dihalide is about 100 weight percent terephthaloyl chloride, about 100 weight percent isophthaloyl chloride, a mixture of about 40 weight percent isophthaloyl chloride and about 60 weight percent terephthaloyl chloride, or a mixture of about 70 weight percent isophthaloyl chloride and about 30 weight percent terephthaloyl chloride.

19. The process of claim 11, wherein the at least one diamine is about 100 weight percent 2, 4 diamino mesitylene, and the at least one dicarboxylic acid dihalide is about 100 isophthaloyl chloride.

20. The process of claim 11, wherein the at least one diamine is about 50 weight percent metaphenylene diamine and about 50 weight percent 2, 4 diamino mesitylene and the at least one dicarboxylic acid dihalide is about 70 weight percent isophthaloyl chloride and about 30 weight percent terephthaloyl chloride.

21. A process for preparing polyamide comprising continuously feeding solutions of (a) at least one aqueous solution of at least one water-soluble inorganic acid acceptor; and (b) at least one prepolymer solution comprising at least one prepolymer and at least one polar, non-basic and inert organic liquid medium, wherein the at least one prepolymer is formed by reacting substantially equimolar amounts of at least one diamine and at least one dicarboxylic acid dihalide in the at least one polar, non-basic and inert organic liquid medium;

into a reactor system having a Peclet number greater than about 3.5 and wherein there is about 95% or more conversion of the total amount of the at least one prepolymer in from about 2 seconds to about 2 minutes of residence time in said reactor system.

22. The process of claim 21, wherein the at least one diamine is at least one aromatic diamine, and the at least one dicarboxylic acid dihalide is at least one aromatic dicarboxylic acid dihalide.

23. The process of claim 22, wherein the at least one polar, non-basic and inert organic liquid medium is tetrahydrofuran.

24. The process of claim 21, wherein the reactor system comprises at least three well-stirred reactors in series.

25. The process of claim 21, wherein the reactor system comprises a mixing apparatus followed by a pipe.

26. The process of claim 25, wherein the mixing apparatus is a centrifugal pump.

27. The process of claim 25, wherein the continuous feeding of (a) and (b) into the pipe forms a flow that is turbulent.

28. The process of claim 25, wherein the at least one diamine is at least one aromatic diamine, and the at least one dicarboxylic acid dihalide is at least one aromatic dicarboxylic acid dihalide.

29. The process of claim 28, wherein the at least one polar, non-basic and inert organic liquid medium is tetrahydrofuran.

* * * * *